United States Patent
Morita et al.

(10) Patent No.: US 7,589,234 B2
(45) Date of Patent: Sep. 15, 2009

(54) FLUOROALKYL CARBOXYLIC ACID DERIVATIVE, METHOD FOR PRODUCING FLUORINE-CONTAINING POLYMER, AND AQUEOUS DISPERSION OF FLUORINE-CONTAINING POLYMER

(75) Inventors: Shigeru Morita, Settsu (JP); Yoshiki Tanaka, Settsu (JP); Keiko Washino, Settsu (JP); Nobuhiko Tsuda, Settsu (JP); Mitsuru Kishine, Settsu (JP)

(73) Assignee: Daikin Industries, Ltd., Osaka (JP)

(*) Notice: Subject to any disclaimer, the term of this patent is extended or adjusted under 35 U.S.C. 154(b) by 141 days.

(21) Appl. No.: 10/562,730

(22) PCT Filed: Jul. 2, 2004

(86) PCT No.: PCT/JP2004/009445

§ 371 (c)(1),
(2), (4) Date: Dec. 30, 2005

(87) PCT Pub. No.: WO2005/003075

PCT Pub. Date: Jan. 13, 2005

(65) Prior Publication Data

US 2006/0281946 A1    Dec. 14, 2006

(30) Foreign Application Priority Data

Jul. 2, 2003    (JP) ............... 2003-190250

(51) Int. Cl.
C07C 59/135 (2006.01)
(52) U.S. Cl. .................................. 562/586
(58) Field of Classification Search ............ None
See application file for complete search history.

(56) References Cited

U.S. PATENT DOCUMENTS

| | | | |
|---|---|---|---|
| 2,713,593 A * | 7/1955 | Brice et al. ............ | 562/586 |
| 4,719,052 A | 1/1988 | Ohsaka et al. | |
| 4,725,375 A * | 2/1988 | Fujii et al. ............ | 252/79.4 |
| 5,118,494 A | 6/1992 | Schultz et al. | |
| 5,476,974 A | 12/1995 | Moore et al. | |
| 5,658,962 A | 8/1997 | Moore et al. | |
| 5,763,552 A | 6/1998 | Feiring et al. | |
| 6,395,848 B1 * | 5/2002 | Morgan et al. ............ | 526/214 |
| 6,429,258 B1 | 8/2002 | Morgan et al. | |

FOREIGN PATENT DOCUMENTS

| | | |
|---|---|---|
| EP | 0 248 446 A2 | 12/1987 |
| EP | 1 189 953 B1 | 7/2004 |
| JP | 39-24263 | 10/1939 |
| JP | 61-49327 | 10/1986 |
| JP | 61-270381 | 11/1986 |
| JP | 63-81104 | 4/1988 |
| JP | 2-223538 | 9/1990 |
| JP | 5-505824 | 8/1993 |
| JP | 10-500950 | 1/1998 |
| JP | 10-95991 | 4/1998 |
| JP | 10-212261 | 8/1998 |
| JP | 2002-323728 | 11/2002 |
| JP | 2003-500495 | 1/2003 |
| WO | WO 91/14422 | 10/1991 |
| WO | WO 95/32174 | 11/1995 |
| WO | WO 00/71590 A1 | 11/2000 |

\* cited by examiner

*Primary Examiner*—Paul A Zucker
*Assistant Examiner*—Yevegeny Valenrod
(74) *Attorney, Agent, or Firm*—Sughrue Mion, PLLC

(57) ABSTRACT

This invention provides a novel compound which can be properly used as a surfactant, a method of producing a fluoropolymer, surfactant and a fluoropolymer aqueous dispersions using the novel compound.

This invention is a fluoroalkylcarboxylic acid derivative which is represented by the general formula (i):

$$Rf^1(OCH_2CF_2CF_2)_{n1}OCX^1X^2CF_2(Rf^2)_{n2}COOM \quad (i)$$

wherein $Rf^1$ represents a straight or branched fluoroalkyl group containing 1 to 20 carbon atoms, which fluoroalkyl group may optionally contain 1 to 5 oxygen atoms in the principal chain thereof, $Rf^2$ represents a straight or branched fluoroalkylene group containing 1 to 25 carbon atoms, said fluoroalkylene group may optionally contain 1 to 5 oxygen atoms in the principal chain thereof, n1 represents an integer of 0 to 3, n2 represents an integer of 0 or 1, $X^1$ and $X^2$ are the same or different and each represents hydrogen atom or fluorine atom, and M represents $NH_4$ or a monovalent metal element.

7 Claims, No Drawings

FLUOROALKYL CARBOXYLIC ACID DERIVATIVE, METHOD FOR PRODUCING FLUORINE-CONTAINING POLYMER, AND AQUEOUS DISPERSION OF FLUORINE-CONTAINING POLYMER

TECHNICAL FIELD

The present invention relates to a fluoroalkylcarboxylic acid derivative, a surfactant, a method of producing fluoropolymers, and a fluoropolymer aqueous dispersion.

BACKGROUND ART

So far disclosed as compounds obtainable by the ring opening reaction of tetrafluorooxetane are 2,2-difluoropropionic acid derivatives represented by $XCH_2CF_2COY$ (wherein X is $R^1O$— or $R^2CH_2CF_2CF_2O$— in which $R^1$ and $R^2$ each is a saturated aliphatic group or halogenated saturated aliphatic group containing 1 to 3 carbon atoms, for instance; and Y is —$OR^3$ in which $R^3$ is a saturated aliphatic group or halogenated saturated aliphatic group containing 1 to 3 carbon atoms, for instance (cf. e.g. Patent Document 1).

However, no carboxylic acid salts are known as compounds obtainable by the ring-opening reaction of tetrafluorooxetane. It is also unknown whether tetrafluorooxetane-derived ring-opening reaction products can be used as surfactants.

Partially fluorinated compounds represented by Rf-$(CH_2)_m$-Rf'-COOM (in which m is 1 to 3, Rf is a perfluoroalkyl or perfluoroalkoxy group containing 3 to 8 carbon atoms, Rf' is a straight or branched perfluoroalkylene group containing 1 to 4 carbon atoms and M is $NH_4$, Li, Na, K or H) are known as surfactants useful in polymerizing fluorinated monomers (cf. e.g. Patent Document 2). In this document, however, there is no description or suggestion about the extents of the reduction in surface tension as brought about by such surfactants or the mean primary particle sizes of the polymers obtained by using the surfactants.

Patent Document 1: Japanese Kokai Publication H02-223538 (claim 1)

Patent Document 2: Japanese Kokai Publication H10-212261

DISCLOSURE OF INVENTION

Problems which the Invention is to Solve

In view of the above-discussed state of the art, it is an object of the present invention to provide a novel compound which can be properly used as a surfactant, a method of producing a fluoropolymer, a surfactant and a fluoropolymer aqueous dispersion using the novel compound.

Means for Solving the Problems

The present invention provides a fluoroalkylcarboxylic acid derivative which is represented by the general formula (i):

$$Rf^1(OCH_2CF_2CF_2)_{n1}OCX^1X^2CF_2(Rf^2)_{n2}COOM \qquad (i)$$

wherein $Rf^1$ represents a straight or branched fluoroalkyl group containing 1 to 20 carbon atoms, which fluoroalkyl group may optionally contain 1 to 5 oxygen atoms in the principal chain thereof, $Rf^2$ represents a straight or branched fluoroalkylene group containing 1 to 25 carbon atoms, said fluoroalkylene group may optionally contain 1 to 5 oxygen atoms in the principal chain thereof, n1 represents an integer of 0 to 3, n2 represents an integer of 0 or 1, $X^1$ and $X^2$ are the same or different and each represents hydrogen atom or fluorine atom, and M represents $NH_4$ or a monovalent metal element.

The invention provides a fluoroalkylcarboxylic acid derivative which is represented by the general formula (ii):

$$Rf^1(OCH_2CF_2CF_2)_{n1}OCHX^1CF_2(Rf^2)_{n2}COOM \qquad (ii)$$

wherein $Rf^1$ represents a straight or branched fluoroalkyl group containing 1 to 20 carbon atoms, said fluoroalkyl group may optionally contain 1 to 5 oxygen atoms in the principal chain thereof, $Rf^2$ represents a straight or branched fluoroalkylene group containing 1 to 25 carbon atoms, said fluoroalkylene group may optionally contain 1 to 5 oxygen atoms in the principal chain thereof, n1 represents an integer of 0 to 3, n2 represents an integer of 0 or 1, $X^1$ represents hydrogen atom or fluorine atom, and M represents $NH_4$ or a monovalent metal element.

The invention also provides a surfactant which comprises the fluoroalkylcarboxylic acid derivative.

The invention further provides a method of producing a fluoropolymer, wherein the above fluoroalkylcarboxylic acid derivative is used as a surfactant in carrying out a polymerization in an aqueous medium.

The invention further provides a fluoropolymer aqueous dispersion, wherein a particle comprising a fluoropolymer is dispersed in an aqueous medium in the presence of the above fluoroalkylcarboxylic acid derivative or the surfactant of the invention.

The invention further provides a fluoropolymer powder which is obtained by coagulating the above fluoropolymer aqueous dispersion.

The invention further provides a fluoropolymer aggregate obtained by coagulating the above fluoropolymer aqueous dispersion, which is a polytetrafluoroethylene powder, a powder or a pellet each comprising a melt-processible resin, or a coagulation comprising an elastomeric polymer.

The invention further provides a film/membrane which is obtained by coating, impregnation or cast film formation using the above fluoropolymer aqueous dispersion.

The invention further provides a molded article which is obtained by molding using the above fluoropolymer powder or the above fluoropolymer aggregate.

The invention still further provides a method of producing a fluoroalkylcarboxylic acid derivative, which comprises producing the above fluoroalkylcarboxylic acid derivative by converting a fluorocarboxylic acid fluoride represented by the general formula (3):

$$Rf^1(OCH_2CF_2CF_2)_{n1}OCX^1X^2CF_2(Rf^2)_{n2}COF \qquad (3)$$

wherein $Rf^1$, $Rf^2$, n1, n2, $X^1$ and $X^2$ are as defined hereinabove, to a fluorocarboxylic acid salt.

In the following, the invention is described in detail.

One of the fluoroalkylcarboxylic acid derivatives of the invention is a novel compound represented by the general formula (i) given above.

The symbol $Rf^1$ in the above general formula (i) represents a straight or branched fluoroalkyl group containing 1 to 20 carbon atoms. A preferred lower limit to the number of carbon atoms is 3, a more preferred lower limit is 1, a preferred upper limit is 15, a more preferred upper limit is 8, and a still more preferred upper limit is 6. The fluoroalkyl group is a group resulting from substitution of one or more fluorine atoms for a part or the whole of the hydrogen atoms bound to the carbon atom(s) in the corresponding alkyl group.

The fluoroalkyl group may optionally contain 1 to 5 oxygen atoms in the principal chain thereof. A preferred upper limit to the number of oxygen atoms in the group $Rf^1$ is 3. The number of oxygen atoms in $Rf^1$ is preferably equal to zero.

Straight or branched fluoroalkyl groups containing 1 to 7 carbon atoms, which may optionally contain 1 to 3 oxygen atoms in the principal chain thereof, are preferred as $Rf^1$, and straight or branched perfluoroalkyl groups containing 1 to 7 carbon atoms, which contain no oxygen atom in the principal chain thereof, are more preferred.

The oxygen atom or atoms which may be contained in the fluoroalkyl group and/or fluoroalkylene group, when contained in the fluoroalkyl and/or fluoroalkylene group, form ether bonds.

Preferred as $Rf^1$ are $CF_3-$, $CF_3CF_2-$, $CF_3CF_2CF_2-$, $(CF_3)_2CF-$, $CF_3CF_2CF_2CF_2-$, $CF_3CF_2CF_2OCF(CF_3)CF_2-$, $HCF_2CF_2CF_2-$ and $CF_3OCF(CF_3)CF_2-$. More preferred as $Rf^1$ are $CF_3CF_2CF_2-$, $(CF_3)_2CF-$ and $CF_3CF_2CF_2CF_2-$. $CF_3CF_2CF_2-$ is still more preferred as $Rf^1$.

In the above general formula (i), $Rf^2$ represents a straight or branched fluoroalkylene group containing 1 to 25 carbon atoms. A preferred lower limit to the number of carbon atoms is 2, while a preferred upper limit is 20, a more preferred upper limit is 15, a still more preferred upper limit is 12, and a most preferred upper limit is 7.

The above fluoroalkylene group may optionally contain 1 to 5 oxygen atoms in the principal chain thereof. A preferred upper limit to the number of oxygen atoms in $Rf^2$ is 4, and more preferred upper limit is 3.

Preferred as $Rf^2$ are $-CF_2OCF_2-$, $-CF_2(OCF(CF_3)CF_2)_{n3}OCF(CF_3)-$ (in which n3 represents an integer of 0 to 4) and $-CF_2(OCF(CF_3)CF_2)_{n4}(CF_2CF_2)_{n5}-$ (in which n4 represents an integer of 0 to 5 and n5 represents an integer of 0 to 6 provided that n4 and n5 satisfy the relation $3 \times n4 + 2 \times n5 \leq 20$).

In the above general formula (i), n1 represents an integer of 0 to 3. A preferred upper limit to n1 is 2, and a preferred lower limit is 1.

In the above general formula (i), n2 represents an integer of 0 or 1. Preferably, n2 is 0 (zero).

$X^1$ and $X^2$ in the above general formula (i) are the same or different and each represents hydrogen atom or fluorine atom. Preferably, at least one of $X^1$ and $X^2$ is fluorine atom.

M in the above general formula (i) represents $NH_4$ or a monovalent metal atom.

$NH_4$ is preferred as the above M in view of its being readily eliminable by heating treatment.

Another class of the fluoroalkylcarboxylic acid derivatives of the invention comprises novel compounds represented by the general formula (ii) given above.

In the general formula (ii), $Rf^1$, $Rf^2$, n1, n2 and M are as defined above.

In the general formula (ii), $X^1$ represents a hydrogen atom or a fluorine atom. The atom $X^1$ is preferably a fluorine atom.

As the fluoroalkylcarboxylic acid derivatives of the invention, there may be mentioned, among others, the following:

Fluorocarboxylic acid salts containing an $-OCH_2CF_2-$ group adjacent to the salt-forming carboxyl group, such as
$CF_3OCF(CF_3)CF_2OCH_2CF_2COONa$,
$CF_3CF_2CF_2OCH_2CF_2COONa$,
$CF_3CF_2CF_2OCH_2CF_2CF_2OCH_2CF_2COONa$,
$FCH_2CF_2CF_2OCH_2CF_2COONa$,
$CF_2HCF_2CF_2OCH_2CF_2COONa$,
$CF_3CF_2CF_2CF_2OCH_2CF_2COONa$, $CF_3OCF(CF_3)CF_2OCH_2CF_2COONH_4$,
$CF_3CF_2CF_2OCH_2CF_2COONH_4$,
$CF_3CF_2CF_2OCH_2CF_2CF_2OCH_2CF_2COONH_4$,
$FCH_2CF_2CF_2OCH_2CF_2COONH_4$,
$CF_2HCF_2CF_2OCH_2CF_2COONH_4$ and
$CF_3CF_2CF_2CF_2OCH_2CF_2COONH_4$;

Fluorocarboxylic acid salts containing an $-OCFHHCF_2-$ group adjacent to the salt-forming carboxyl group, such as
$CF_3OCF(CF_3)CF_2OCFHCF_2COONa$,
$CF_3CF_2CF_2OCFHCF_2COONa$,
$CF_3CF_2CF_2OCH_2CF_2CF_2OCFHCF_2COONa$,
$FCH_2CF_2CF_2OCFHCF_2COONa$,
$CF_2HCF_2CF_2OCFHCF_2COONa$,
$CF_3CF_2CF_2CF_2OCFHCF_2COONa$, $CF_3OCF(CF_3)CF_2OCFHCF_2COONH_4$,
$CF_3CF_2CF_2OCH_2CF_2CF_2OCFHCF_2COONH_4$,
$FCH_2CF_2CF_2OCFHCF_2COONH_4$,
$CF_3CF_2CF_2OCFHCF_2COONH_4$,
$CF_2HCF_2CF_2OCFHCF_2COONH_4$ and
$CF_3CF_2CF_2CF_2OCFHCF_2COONH_4$; and Fluorocarboxylic acid salts containing an $-OCFHCF_2-$ group adjacent to the salt-forming carboxyl group, such as
$CF_3OCF(CF_3)CF_2OCF_2CF_2COONa$,
$CF_3CF_2CF_2OCF_2CF_2COONa$,
$CF_3CF_2CF_2OCH_2CF_2CF_2OCF_2CF_2COONa$,
$FCH_2CF_2CF_2OCF_2CF_2COONa$,
$CF_2HCF_2CF_2OCF_2CF_2COONa$,
$CF_3CF_2CF_2CF_2OCF_2CF_2COONa$, $CF_3OCF(CF_3)CF_2OCF_2CF_2COONH_4$, $CF_3CF_2CF_2OCF_2CF_2COONH_4$,
$CF_3CF_2CF_2OCH_2CF_2CF_2OCF_2CF_2COONH_4$,
$FCH_2CF_2CF_2OCF_2CF_2COONH_4$,
$CF_2HCF_2CF_2OCF_2CF_2COONH_4$ and
$CF_3CF_2CF_2CF_2OCF_2CF_2COONH_4$.

The fluoroalkylcarboxylic acid derivatives of the invention are characterized in that they contain $-O-CX^1X^2CF_2-$ adjacent to $Rf^1(OCH_2CF_2CF_2)_{n1}-$ ($Rf^1$, $X^1$, $X^2$ and n1 being as defined above) as indicated by the general formula (i) given above. The group $-O-CX^1X^2CF_2-$ can be introduced by ring-opening addition of tetrafluorooxetane by the method of producing fluoroalkylcarboxylic acid derivatives according to the invention, which is to be described later herein.

The method of producing a fluoroalkylcarboxylic acid derivative according to the invention comprises producing the above fluoroalkylcarboxylic acid derivative by converting a fluorocarboxylic acid fluoride represented by the general formula (3):

$$Rf^1(OCH_2CF_2CF_2)_{n1}OCX^1X^2CF_2(Rf^2)_{n2}COF \qquad (3)$$

wherein $Rf^1$, $Rf^2$, n1, n2, $X^1$ and $X^2$ are as defined above, to a fluorocarboxylic acid salt.

In the method of producing the fluoroalkylcarboxylic acid derivative according to the invention, the above group $Rf^1$ is preferably a straight or branched fluoroalkyl group containing 5 to 7 carbon atoms and, in this case, the fluoroalkyl group may optionally contain 1 to 5 oxygen atoms in the principal chain thereof.

The conversion of the fluorocarboxylic acid fluoride represented by the general formula (3) given above to the fluorocarboxylic acid salt is preferably carried out by (A) a method comprising converting the terminal $-COF$ group in the general formula (3) to $-COOH$ by hydrolysis using an acid and converting the $-COOH$ to $-COOM$ by neutralization with an alkali, (B) a method comprising esterifying the terminal $-COF$ group in the general formula (3) and, after separation of the ester, converting the ester moiety to $-COOM$ by saponification, or (C) a method comprising esterifying the terminal —COF group in the general formula (3) and, after separation of the ester, converting the ester moiety to —COOM by saponification, then converting the latter to —COOH using an acid and then converting this to —COOM by neutralization with an alkali.

When n2 in the general formula (3) is 1, the fluorocarboxylic acid fluoride represented by the general formula (3) is preferably a product obtained by reacting an intermediate fluorocarboxylic acid fluoride represented by the general formula (2):

$$Rf^1(OCH_2CF_2CF_2)_{n1}OCX^1X^2CF_2COF \quad (2)$$

wherein $Rf^1$, n1, $X^1$ and $X^2$ are as defined above, with tetrafluoroethylene and iodine in an aprotic polar solvent to thereby convert the terminal —COF in the above general formula (2) to —$CF_2OCF_2CF_2I$, followed by further conversion of the latter to —$CF_2OCF_2COF$ by reaction with oleum, or a product obtained by converting the terminal —COF in the general formula (2) to —$CF_2(OCF(CF_3)CF_2)_pOCF(CF_3)COF$ [p being an integer of 0 to 5] by addition of hexafluoropropylene oxide, converting the terminal —$CF(CF_3)COF$ to —$CF(CF_3)I$ via —$CF(CF_3)COI$ and converting —$CF(CF_3)I$ to —$CF(CF_3)(CF_2CF_2)_qI$ (q being an integer of 1 to 5), followed by further conversion to —$CF(CF_3)(CF_2CF_2)_{q-1}CF_2COF$.

When n2 in the general formula (3) is 0, the fluorocarboxylic acid fluoride represented by the general formula (3) is the intermediate fluorocarboxylic acid fluoride represented by the general formula (2) itself. Therefore, the above-mentioned reaction for addition of $Rf^2$ is not indispensable. However, the method of producing the fluoroalkylcarboxylic acid derivative according to the invention includes the method of converting the intermediate fluorocarboxylic acid fluoride to the fluorocarboxylic acid salt as well.

The intermediate fluorocarboxylic acid fluoride represented by the general formula (2) is preferably a second intermediate represented by the general formula (2a):

$$Rf^1(OCH_2CF_2CF_2)_{n1}OCHFCF_2COF \quad (2a)$$

wherein $Rf^1$ and n1 are as defined above, as obtained by monofluorinating a first intermediate represented by the general formula (1):

$$Rf^1(OCH_2CF_2CF_2)_{n1}OCH_2CF_2COF \quad (1)$$

wherein $Rf^1$ and n1 are as defined above, or a third intermediate represented by the general formula (2b):

$$Rf^1(OCH_2CF_2CF_2)_{n1}OCF_2CF_2COF \quad (2b)$$

wherein $Rf^1$ and n1 are as defined above, as obtained by difluorinating the above first intermediate.

While the intermediate fluorocarboxylic acid fluoride represented by the general formula (2) is preferably the second intermediate or third intermediate, as mentioned above, they may also be the first intermediate itself.

The first intermediate is obtained by the ring-opening addition reaction involving ring-opening addition of tetrafluorooxetane to a fluorine-containing acid fluoride represented by $Rf^3COF$ (in which $Rf^3$ is a group derived from the $Rf^1$ group by elimination of one carbon atom). The ring-opening addition reaction will be described later herein.

The method of producing the fluoroalkylcarboxylic acid derivative according to the invention is not particularly restricted but may be, for example, the method comprising (1) the step of synthesizing the first intermediate $Rf^1(OCH_2CF_2CF_2)_{n1}OCH_2CF_2COF$ ($Rf^1$ and n1 being as defined above) by ring-opening addition of tetrafluorooxetane to a fluorine-containing fluoride represented by $Rf^3COF$ (in which $Rf^3$ is a group derived from the $Rf^1$ group by elimination of one carbon atom) and, if necessary, fluorinating the first intermediate to thereby convert the same to the second intermediate represented by the general formula (2a) or the third intermediate represented by the general formula (2b), and (2) the step of converting the terminal —COF in the above-mentioned first, second or third intermediate to —$(Rf^2)_{n2}COOM$.

In the above step (1), the fluorine-containing fluoride represented by $Rf^3COF$, when $Rf^1$ is, for example, $CF_2CF_2CF_2$—, is $CF_3CF_2COF$.

The above step (1) can be carried out, for example, according to the method (described in Patent Document 1) comprising reacting the fluorine-containing acid fluoride represented by $Rf^3COF$ with tetrafluorooxetane in an aprotic polar solvent using the fluoride ion as a catalyst to give $Rf^1OCH_2CF_2COF$.

As the ion source for the fluoride ion, there may be mentioned alkali metal fluorides such as cesium fluoride, potassium fluoride and sodium fluoride, and tetramethylurea, among others.

As the aprotic polar solvent, there may be mentioned glymes such as tetraglyme, diglyme, triglyme and polyglymes, THF, dioxane, DMF, DMA, HMPT and acetonitrile, among others.

The reaction between the fluorine-containing acid fluoride and tetrafluorooxetane can be carried out generally at a temperature of −50 to 200° C. and a pressure of 0 to 1 MPa for 1 to 24 hours with stirring.

The progress of the reaction between the fluorine-containing acid fluoride and tetrafluorooxetane is monitored by gas chromatography, for instance.

As for the catalyst addition level on the mole basis, the catalyst is preferably used in an amount of 1 to 100 mole percent relative to the total amount of the fluorine-containing acid fluoride used. A more preferred lower limit is 5 mole percent, and a more preferred upper limit is 50 mole percent.

The amount of the solvent is not particularly restricted but the solvent may be used in a fairly large amount in cases where the pressure predicted from the boiling point of the fluorine-containing acid fluoride employed and the reaction temperature should be lowered. However, an excessively large amount makes it difficult to separate and recover the product after the reaction and, therefore, the catalyst is preferably used in an amount of 0.1 to 1000 times the volume of the fluorine-containing acid fluoride used. A more preferred lower limit is half, and a more preferred upper limit is 2 times.

The proportion of the fluorine-containing acid fluoride relative to the total number of moles of the fluorine-containing acid fluoride and tetrafluorooxetane is preferably within the range of 9 to 95 mole percent. From the yield viewpoint, a more preferred lower limit to the proportion of the fluorine-containing acid fluoride may be set at 15 mole percent and a more preferred upper limit to 50 mole percent. When n1 in the above general formula (i) or (ii) is 0 (zero), a still more preferred lower limit is 45 mole percent and a still more preferred upper limit is 55 mole percent. When n1 in the above general formula (i) or (ii) is 1, a still more preferred lower limit is 30 mole percent and a still more preferred upper limit is 40 mole percent. When n1 in the above general formula (i) or (ii) is 3, a still more preferred lower limit is 20 mole percent and a still more preferred upper limit is 30 mole percent.

The reaction vessel to be used for the reaction between the fluorine-containing acid fluoride and tetrafluorooxetane is not particularly restricted provided that it is securely airtight and allows stirring. It may be a metal-made vessel, a plastic vessel made of a fluororesin or a like plastic, or a glass vessel (although possibly susceptible to erosion in case of intrusion of water). The reaction vessel should be selected taking the reactant quantity, reaction temperature and reaction pressure into consideration.

The reaction between the fluorine-containing acid fluoride and tetrafluorooxetane may allow addition of two or more molecules of tetrafluorooxetane to each fluorine-containing acid fluoride molecule, and the reaction product generally becomes a mixture of first intermediate molecules differing in the number of tetrafluorooxetane molecules added. Therefore, a procedure for separating the first intermediate with a specific addition level or level range (hereinafter sometimes referred to as "desired first intermediate") from among the first intermediate mixture mentioned above is preferably carried out prior to fluorination.

The above separation procedure can be carried out by means of rectification using a rectification column having an appropriate number of plates. The appropriate number of plates is determined by the boiling range of the fluorine-containing acid fluoride fraction to be excluded, the boiling point of the aprotic polar solvent, and the boiling point of the desired first intermediate, among others.

After separation of the desired first intermediate by the above separation procedure, the desired first intermediate can be subjected to fluorination according to need.

The fluorination can be carried out using any of the conventional fluoride radical generating sources such as $CoF_3$, $AgF_2$, $UF_6$, $OF_2$, $N_2F_2$, $OF_3OF$, $IF_5$, $ClF_3$ and like fluorinating reagents; and gaseous $F_2$.

In the above fluorination, a metal vessel or a fluororesin vessel, for instance, is used.

In carrying out the fluorination, the use of a solvent is not required but a solvent may be used. When a polar solvent such as acetonitrile, for instance, is used, the second intermediate can be obtained with a high yield. Complete fluorination gives the above third intermediate.

When the second intermediate and third intermediate are obtained in a mixture form, they can be separated from each other by a separation/purification method utilizing the difference in boiling point, for example by rectification or distillation. Since the difference in boiling point between the second intermediate and third intermediate is small, a rectification column with a high number of plates is required for obtaining high-purity products.

In cases where it is difficult to separate the desired first intermediate by the above separation procedure, the terminal —COR is esterified using an alcohol such as methanol, and the desired first intermediate-derived esterification product is separated from the conversion product, namely a mixture of first intermediate-derived esterification products represented by the general formula (4):

   (4)

wherein $Rf^1$ and n1 are as defined above and $R^4$ represents an alkyl group containing 1 to 10 carbon atoms which may optionally contain one or more fluorine atoms as substituent (s) for one or more hydrogen atoms.

The first intermediate-derived terminal esterification product mentioned above is the product of conversion of the terminal to —$COOR^4$ ($R^4$ being as define above) with the number of tetrafluorooxetane molecules added being the same in the desired first intermediate.

The separation of the desired first intermediate-derived terminal esterification product can be generally realized by a separation/purification method utilizing the difference in boiling point, for example rectification or distillation. Since the first intermediate-derived terminal esterification product is higher in boiling point as compared with the first intermediate, the separation may become easy in some instances depending on the aprotic polar solvent used in combination.

Unlike the case of the terminal being —COF, there is no fear of the terminal esterification product reacting with moisture to generate hydrogen fluoride and thus cause erosion of glass. Therefore, a glass-made apparatus can be used with safety.

In the step (1) mentioned above, the first intermediate is an intermediate for the production of fluoroalkylcarboxylic acid derivatives of the general formula (i) in which each of $X^1$ and $X^2$ is hydrogen atom. The second intermediate is an intermediate for the production of fluoroalkylcarboxylic acid derivatives of the general formula (i) in which either one of $X^1$ and $X^2$ is fluorine atom. The third intermediate is an intermediate for the production of fluoroalkylcarboxylic acids of the general formula (i) in which each of $X^1$ and $X^2$ is fluorine atom. The term "intermediate" so referred to hereinafter without addition of "first", "second" or "third" includes, within the meaning thereof, the above-mentioned first intermediate, second intermediate and third intermediate.

When n2 is 0 (zero) in the general formula (3), the above-mentioned step (2) consists in converting the terminal —COF in the intermediate to —COOM (M being as defined above).

The intermediate, when hydrolyzed with an acid and, after elimination of the byproduct hydrogen fluoride, subjected to distillation, gives a high-purity fluoroalkylcarboxylic acid represented by the general formula (5):

   (5)

wherein $Rf^1$, n1, $X^1$ and $X^2$ are as defined above, which can then be converted to the fluoroalkylcarboxylic acid derivative of the invention by neutralization with an alkali. This method is the above-mentioned method (A) of the invention itself comprising converting a fluorocarboxylic acid fluoride to the fluorocarboxylic acid salt.

The first intermediate terminal esterification product can be converted to the fluoroalkylcarboxylic acid derivative of the invention by the method comprising saponifying the terminal —$COOR^4$ ($R^4$ being as defined above) to —COOM (M being as defined above) (this method corresponds to the above-mentioned method (B) comprising converting a fluorocarboxylic acid fluoride to the fluorocarboxylic acid salt), or by the method comprising saponifying —$COOR^4$ ($R^4$ being as defined above), then converting the resulting group to —COOH using an acid and converting —COOH to —COOM by neutralization with an alkali (this method corresponds to the above-mentioned method (C) comprising converting a fluorocarboxylic acid fluoride to the fluorocarboxylic acid salt).

When n2 in the above general formula (3) is 1, the above step (2) can be carried out, for example, by:

Method (a): the method comprising reacting the intermediate with tetrafluoroethylene and iodine in acetonitrile to convert the terminal —COF of the intermediate to —$CF_2OCF_2CF_2I$ (as described in J. F. C. 10 (1977) 85 to 110), converting the latter to —$CF_2OCF_2COF$ by reaction with oleum, then hydrolyzing the terminal —COF in —$CF_2OCF_2COF$, and neutralizing the resulting acid;

Method (b): the method comprising carrying out the reaction for converting the terminal —COF of the intermediate to —CF$_2$(OCF(CF$_3$)CF$_2$)$_p$OCF(CF$_3$)COF (p being an integer of 0 to 5) by addition of hexafluoropropylene oxide (as described in Japanese Kokai Publication S57-54147), the reaction for converting the terminal —CF(CF$_3$)COF in the above terminal —CF$_2$(OCF(CF$_3$)CF$_2$)$_p$OCF(CF$_3$)COF to —CF(CF$_3$)COI and then converting the latter to —CF(CF$_3$)I (as described in Japanese Kokai Publication H05-9150) and the reaction for converting the above terminal —CF(CF$_3$)I to —CF(CF$_3$) (CF$_2$CF$_2$)$_q$I (q being an integer of 1 to 5) and then converting the latter to —CF(CF$_3$)(CF$_2$CF$_2$)$_{q-1}$CF$_2$COF (as described in Japanese Kokai S58-152839), in that order and then hydrolyzing the terminal —COF in the above —CF(CF$_3$) (CF$_2$CF$_2$)$_{q-1}$CF$_2$COF, followed by neutralization.

In the above-mentioned method (a) and method (b), the hydrolysis may be carried out by the method using an acid such as dilute sulfuric acid, and the neutralization may be carried out by the method using an alkali metal hydroxide such as sodium hydroxide, or aqueous ammonia.

The fluoroalkylcarboxylic acid derivatives of the invention, which have the structure mentioned above, show good properties as surfactants and can be adequately used, for example, as surfactants in the production of fluoropolymers by polymerization and also as dispersants in preparing fluoropolymer aqueous dispersions.

The fluoroalkylcarboxylic acid derivatives of the invention reduce the surface tension to a lesser extent as compared with the conventional surfactants. The reduction in surface tension means an increase in emulsifying power and, therefore, compounds less capable of reducing the surface tension are generally unsuited for use as emulsifiers in polymerization processes. However, the fluoroalkylcarboxylic acid derivatives of the invention, in spite of their low surface tension reducing ability, show a high level of emulsifying power and, when used as emulsifiers in the production of fluoropolymer by polymerization, which will be described later herein, can increase the average primary particle diameter of fluoropolymer particles.

The average primary particle diameter is the mean value of diameters of fluoropolymer particles in a dispersion in a state such that the fluoropolymer after completion of the polymerization reaction has not yet been subjected to any procedure that substantially alters the concentration thereof.

The fluoroalkylcarboxylic acid derivatives of the invention satisfactorily produce the effect mentioned above even when used singly. However, two or more species may be used simultaneously. Further, the fluoroalkylcarboxylic acid derivatives of the invention may be used in combination with one or more of the known compounds having surface activity.

The term "fluoropolymer" as used herein means a polymer containing carbon atom-bound fluorine atoms. In accordance with the invention, the fluoropolymer is obtained by polymerizing one or more fluorine-containing monomer species and may be one obtained by copolymerization of a fluorine-free monomer as well. The "fluorine-containing monomer" is a monomer containing at least one fluorine atom bound to a carbon atom. The fluoropolymer will be described later herein.

The fluoroalkylcarboxylic acid derivatives of the invention can be properly used in or as photographic emulsions, photographic processing agents, cosmetics, detergents, foaming agents, antifoaming agents, greases, lubricants, metal surface finishing agents, mold release agents, abrasive agents, waxes, crystal growth controlling agents, cement additives, digesting agents, etching agents, leather treatment agents, pharmaceuticals, pesticides, insecticides, lumping inhibitors, repellents, and ordinary surfactants for polymerization or dispersants. In the above respective fields of application, the fluoroalkylcarboxylic acid derivatives of the invention may be used singly or two or more of them may be used simultaneously, or they may be used in admixture with one or more other substances. In the above respective fields of application, those methods which are known in the art can be employed.

The surfactants of the invention comprise at least one of the fluoroalkylcarboxylic acid derivatives of the invention.

The surfactants of the invention, even when they comprise only one of the fluoroalkylcarboxylic acid derivatives of the invention, can satisfactorily function as surfactants. However, they may comprise two or more of the fluoroalkylcarboxylic acid derivatives of the invention.

The surfactants of the invention may further contain one or more other compounds having surface activity in addition to at least one of the fluoroalkylcarboxylic acid derivatives.

The other compounds having surface activity are not particularly restricted but may be, for example, anionic, cationic, nonionic or betaine-type surfactants. These surfactants may be hydrocarbon-derives ones.

The surfactants of the invention may further contain at least one additive in addition to at least one of the fluoroalkylcarboxylic acid derivatives of the invention and the optional other compound(s) having surface activity. The additive is not particularly restricted but may be one generally used in ordinary surfactants, for example a stabilizer.

The surfactants of the invention can be suitably used as emulsifiers to be present in polymerization processes for the production of fluoropolymers and, in addition, can be suitably used also as dispersants for dispersing the fluoropolymers obtained by polymerization in an aqueous medium.

The method of producing fluoropolymers according to the invention uses at least one of the above-mentioned fluoroalkylcarboxylic acid derivatives as a surfactant in carrying out the polymerization in an aqueous medium.

While the use of only one of the fluoroalkylcarboxylic acid derivatives can produce the surfactant effect in the process of producing fluoropolymers, two or more species may be used simultaneously. The fluoroalkylcarboxylic acid derivatives may be used in combination with one or more other compounds having surface activity.

In producing fluoropolymers in accordance with the invention, the polymerization is carried out by charging a polymerization vessel with an aqueous medium, at least one of the fluoroalkylcarboxylic acid derivatives, and a monomer or monomers, if necessary together with one or more additives, stirring the contents in the reaction vessel, maintaining the reaction vessel at a predetermined polymerization temperature, and then adding a predetermined amount of a polymerization initiator to initiate the polymerization reaction. After the start of the polymerization reaction, a monomer or monomers, a polymerization initiator, a chain transfer agent and/or at least one of the fluoroalkylcarboxylic acid derivatives of the invention may be additionally fed to the reaction vessel in accordance with the intended purpose.

In the above polymerization, the polymerization temperature is generally 5 to 120° C., and the reaction pressure is generally 0.05 to 10 MPa. The polymerization temperature and polymerization pressure are to be properly selected according to the monomer species used, the desired polymer molecular weight and the rate of reaction.

The "aqueous medium" so referred to hereinabove is a reaction medium in which the polymerization is to be carried out and means a water-containing liquid. The aqueous medium is not particularly restricted provided that it contains water. It may be composed of water and a fluorine-free organic solvent, such as an alcohol, ether or ketone, and/or a fluorine-containing organic solvent having a boiling point not higher than 40° C. It may be water containing one of the organic solvents mentioned above. In carrying out suspension polymerization, for instance, water and a fluorine-containing organic solvent may be used in combination.

The above-mentioned aqueous medium can be used as the aqueous medium in the fluoropolymer aqueous dispersions of the invention, which will be described later herein.

In the above-mentioned polymerization, the fluoroalkyl-carboxylic acid derivatives are preferably used at a total addition level of 0.0001 to 20% by mass relative to the aqueous medium. A more preferred lower limit is 0.001% by mass, a more preferred upper limit is 15% by mass, a still more preferred upper limit is 10% by mass, and a most preferred upper limit is 1% by mass. The addition level is to be properly determined taking into consideration the monomer species used and the desired polymer molecular weight, among others.

In the above polymerization, the fluoroalkylcarboxylic acid derivatives are more preferably added at the time of starting the polymerization at a total addition level of 0.0001 to 20% by mass relative to the aqueous medium.

The polymerization initiator is not particularly restricted but may be any of those capable of radical generation within the polymerization temperature range mentioned above. This, the oil-soluble and/or water-soluble polymerization initiators known in the art can be used. Further, the polymerization can also be initiated by using a reducing agent, for instance, in combination to form a redox system. The concentration of the polymerization initiator is to be properly selected according to the monomer species, the desired polymer molecular weight and the rate of reaction.

Further, in the above polymerization, the rate of polymerization and the molecular weight can be adjusted by adding one or more of the chain transfer agents and radical scavengers known in the art in accordance with the intended purpose.

The fluoropolymers are the products of polymerization of one or more fluorine-containing monomers and, according to the intended purpose, one or more fluorine-free monomers may also be copolymerized.

As the fluorine-containing monomers, there may be mentioned, among others, fluoroolefins, preferably fluoroolefins containing 2 to 10 carbon atoms; fluorinated cyclic monomers; and fluorinated alkyl vinyl ethers represented by the formula —$CY_2$=$CYOR^5$ or —$CY_2$=$CYOR^6OR^5$ (in which Y is H or F, $R^5$ is an alkyl group containing 1 to 8 carbon atoms with a part or the whole of the hydrogen atoms having been substituted by a fluorine atom or atoms and $R^6$ is an alkylene group containing 1 to 8 carbon atoms with a part or the whole of the hydrogen atoms having been substituted by a fluorine atom or atoms).

The fluoroolefins preferably contain 2 to 6 carbon atoms. As the fluoroolefins containing 2 to 6 carbon atoms, there may be mentioned, for example, tetrafluoroethylene [TFE], hexafluoropropylene [HFP], chlorotrifluoroethylene [CTFE], vinyl fluoride, vinylidene fluoride [VDF], trifluoroethylene, hexafluoroisobutylene and perfluorobutylethylene. As preferred examples of the fluorinated cyclic monomers, there may be mentioned perfluoro-2,2-dimethyl-1,3-dioxole [PDD] and perfluoro-2-methylene-4-methyl-1,3-dioxolane [PMD].

The group $R^5$ in the above-mentioned fluorinated alkyl vinyl ethers preferably contains 1 to 4 carbon atoms and, more preferably, one in which all the hydrogen atoms have been replaced by fluorine. The group $R^6$ preferably contains 2 to 4 carbon atoms and, more preferably, is one in which all the hydrogen atoms have been replaced by fluorine atoms.

As the fluorine-free monomers mentioned above, there may be mentioned hydrocarbon-based monomers reactive with the fluorine-containing monomers mentioned above. The hydrocarbon-based monomers include, among others, alkenes such as ethylene, propylene, butylenes and isobutylene; alkyl vinyl ethers such as ethyl vinyl ether, propyl vinyl ether, butyl vinyl ether, isobutyl vinyl ether and cyclohexyl vinyl ether; vinyl esters such as vinyl acetate, vinyl propionate, vinyl n-butyrate, vinyl isobutyrate, vinyl valerate, vinyl pivalate, vinyl caproate, vinyl caprylate, vinyl caprate, vinyl versatate, vinyl laurate, vinyl myristate, vinyl palmitate, vinyl stearate, vinyl benzoate, vinyl p-tert-butylbenzoate, vinyl cyclohexanecarboxylate, vinyl monochloroacetate, vinyl adipate, vinyl acrylate, vinyl methacrylate, vinyl crotonate, vinyl sorbate, vinyl cinnamate, vinyl undecylenate, vinyl hydroxyacetate, vinyl hydroxypropionate, vinyl hydroxybutyrate, vinyl hydroxyvalerate, vinyl hydroxyisobutyrate and vinyl hydroxycyclohexanecarboxylate; alkyl allyl ethers such as ethyl allyl ether, propyl allyl ether, butyl allyl ether, isobutyl allyl ether and cyclohexyl allyl ether; and alkyl allyl esters such as allyl acetate, allyl propionate, allyl butyrate, allyl isobutyrate and allyl cyclohexanecarboxylate.

The fluorine-free monomers further include functional group-containing hydrocarbon-based monomers. As the functional group-containing hydrocarbon-based monomers, there may be mentioned, for example, hydroxyalkyl vinyl ethers such as hydroxyethyl vinyl ether, hydroxypropyl vinyl ether, hydroxybutyl vinyl ether, hydroxyisobutyl vinyl ether and hydroxycyclohexyl vinyl ether; carboxyl group-containing, fluorine-free monomers such as itaconic acid, succinic acid, succinic anhydride, fumaric acid, fumaric anhydride, crotonic acid, maleic acid, maleic anhydride and perfluorobutenoic acid; glycidyl group-containing, fluorine-free monomers such as glycidyl vinyl ether and glycidyl allyl ether; amino group-containing, fluorine-free monomers such as aminoalkyl vinyl ethers and aminoalkyl allyl ethers; amide group-containing, fluorine-free monomers such as (meth) acrylamide and methylolacrylamide.

As the fluoropolymers suitably producible by the production method of the invention, there may be mentioned TFE polymers in which the monomer accounting for the highest monomer mole fraction in the polymer (hereinafter "most abundant monomer") is TFE, VDF polymers in which the most abundant monomer is VDF, and CTFE polymers in which the most abundant monomer is CTFE.

The TFE polymers may suitably be TFE homopolymers, or copolymers derived from (1) TFE, (2) one or more fluorine-containing monomers other than TFE, which contain 2 to 8 carbon atoms, in particular HFP and/or CTFE, and (3) another monomer or other monomers. As the other monomers mentioned above under (3), there may be mentioned, for example, fluoro(alkyl vinyl ether) species having an alkyl group containing 1 to 5 carbon atoms, in particular 1 to 3 carbon atoms; fluorodioxole; perfluoroalkylethylenes; ω-hydroperfluoroolefins, etc.

The TFE polymers may also be copolymers of TFE and one or more fluorine-free monomers. The fluorine-free monomers are, for example, alkenes such as ethylene and propylene; vinyl esters; and vinyl ethers. The TFE polymer may further be copolymers of TFE, one or more fluorine-containing monomers containing 2 to 8 carbon atoms and one or more fluorine-free monomers.

Suitable examples of the VDF polymers are, among others, VDF homopolymers [PVDF], and copolymers composed of (1) VDF and (2) one or more fluoroolefins other than VDF, which contain 2 to 8 carbon atoms, in particular TFE, HFP and/or CTFE, and (3) perfluoro(alkyl vinyl ether) species having an alkyl group containing 1 to 5 carbon atoms, in particular 1 to 3 carbon atoms.

The CTFE polymers may suitably be CTFE homopolymers, or copolymers composed of (1) CTFE, (2) one or more fluoroolefins other than CTFE, which contain 2 to 8 carbon atoms, and (3) one or more perfluoro(alkyl vinyl ether) species having an alkyl group containing 1 to 5 carbon atoms, in particular 1 to 3 carbon atoms.

The CTFE polymers may further be copolymers of CTFE and one or more fluorine-free monomers and, as the fluorine-free monomers, there may be mentioned alkenes such as ethylene and propylene; vinyl esters; and vinyl ethers, among others.

The fluoropolymers produced by the production method of the invention may be glass-like, plastic or elastomeric. These are noncrystalline or partially crystalline and can be subjected to compression baking processing, melt processing or non-melt processing.

In accordance with the production method of the invention, there can suitably be produced, for example, (I) polytetrafluoroethylene polymers [PTFE polymers] as non-melt processible resins, (II) ethylene/TFE copolymers [ETFE], TFE/HFP copolymers [FEP] and TFE/perfluoro(alkyl vinyl ether) copolymers [PFA, MFA, etc.] as melt-processible resins, and (III) such elastomeric copolymers as TFE/propylene copolymers, TFE/propylene/third monomer copolymers (the third monomer being VDF, HFP, CTFE, perfluoro(alkyl vinyl ether) and/or the like), TFE/perfluoro(alkyl vinyl ether) copolymers; HFP/ethylene copolymers, HFP/ethylene/TFE copolymers; PVDF; VDF/HFP copolymers, HFP/ethylene copolymers, VDF/TFE/HFP copolymers and like thermoplastic elastomers; and fluorine-containing segmented polymers described in Japanese Patent Publication S61-49327.

The perfluoro(alkyl vinyl ether) referred to above is represented by the formula:

$$Rf^4(OCFQ^1CF_2)_j(OCR^7Q^2CF_2CF_2)_k(OCF_2)_hOCF=CF_2$$

wherein $Rf^4$ represents a perfluoroalkyl group containing 1 to 6 carbon atoms, j, k and h are the same or different and each represents an integer of 0 to 5, $Q^1$, $Q^2$ and $R^7$ are the same or different and each represents F or $CF_3$.

The above-mentioned non-melt processible resins (I), melt-processible resins (II) and elastomeric polymers (III), which are suitably producible by the production method of the invention are preferably produced in the following manner.

(I) Non-Melt Processible Resins

In carrying out the production method of the invention, the polymerization for producing PTFE polymers is generally carried out at a polymerization temperature of 10 to 100° C. and a polymerization pressure of 0.05 to 5 MPa.

In the above polymerization, a pressure-resistant reaction vessel equipped with a stirrer is charged with pure water and the fluoroalkylcarboxylic acid derivative of the invention and, after deoxygenation, further charged with TFE, the temperature is raised to a predetermined level, and a polymerization initiator is added to initiate the reaction. Since otherwise the pressure lowers with the progress of the reaction, an additional quantity of TFE is fed to the reaction vessel continuously or intermittently so as to maintain the initial pressure. After completion of feeding of a predetermined amount of TFE, the feeding is stopped, the TFE remaining in the reaction vessel is purged, and the temperature is returned to room temperature. The reaction is thus finished.

In producing the PTFE polymers mentioned above, one or more of various modifier monomers known in the art can be used in combination. The polytetrafluoroethylene polymers [PTFE polymers] so referred to herein conceptually include not only TFE homopolymers but also those copolymers of TFE and a modifier monomer or monomers which are non-melt processible [hereinafter sometimes referred to as "modified PTFEs"]).

As the modifier monomers, there may be mentioned, among others, perhaloolefins such as HFP and CTFE; fluoro (alkyl vinyl ether) species having an alkyl group containing 1 to 5, in particular 1 to 3, carbon atoms; fluorinated cyclic monomers such as fluorodioxole; perhaloalkylethylenes; and ω-hydroperhaloolefins. The modifier monomer feeding may be carried out initially all at once, or continuously, or intermittently in portions, according to the intended purpose and the feeding of TFE.

The modifier monomer content in the modified PTFEs is generally within the range of 0.001 to 2 mole percent.

In producing the PTFE polymers, the above-mentioned fluoroalkylcarboxylic acid derivates can be used within the range of usage in the method of producing fluoropolymers according to the invention. Generally, they are used at an addition level of 0.0001 to 5% by mass relative to the aqueous medium. The fluoroalkylcarboxylic acid derivative concentration is not particularly restricted provided that it is within the above range but the addition is generally carried out at the time of start of the polymerization at a level not higher than the critical micelle concentration (CMC). When the addition level is excessively high, acicular particles with a large aspect ratio are formed, hence the aqueous dispersion becomes gel-like and the stability is impaired.

In producing the PTFE polymers, persulfate salts (e.g. ammonium persulfate) or organic peroxides such as disuccinoyl peroxide and diglutaroyl peroxide may be used as the polymerization initiator, either singly or in the form of a mixture of these. These may also be used in combination with a reducing agent such as sodium sulfite to give redox systems. Further, during polymerization, the radical concentration in the system can be adjusted by adding a radical scavenger such as hydroquinone or catechol or a peroxide-decomposing agent such as ammonium sulfite.

In producing the PTFE polymers, use can be made of any of the known chain transfer agents, for example saturated hydrocarbons such as methane, ethane, propane and butane, halogenated hydrocarbons such as chloromethane, dichloromethane and difluoromethane, alcohols such as methanol and ethanol, and hydrogen. Those which are gaseous at ordinary temperature and ordinary pressure are preferred.

The chain transfer agent is generally used in an amount of 1 to 1000 ppm, preferably 1 to 500 ppm, relative to the total feed of TFE.

In producing the PTFE polymers, use can further be made, as a dispersion stabilizer for the reaction system, of 2 to 10 parts by mass, per 100 parts by mass of the aqueous medium, of a saturated hydrocarbon which contains not less than 12 carbon atoms, is substantially inert to the reaction and occurs as a liquid under the reaction conditions mentioned above. Furthermore, ammonium carbonate, ammonium phosphate or the like may be added as a buffering agent for adjusting the pH during reaction.

At the time of completion of the polymerization, the PTFE polymer concentration, on the solid matter basis, in the aqueous dispersion is 10 to 40% by mass, with an average primary particle diameter of 0.05 to 5000 μm. By the use of the fluoroalkylcarboxylic acid derivative of the invention, in particular, aqueous dispersions containing PTFE polymer particles with a very small particle diameter not exceeding 0.2 μm can be obtained. The PTFE polymers at the time of completion of the polymerization have a number average molecular weight of 1,000 to 10,000,000.

The aqueous PTFE polymer dispersion is subjected to coagulation and drying steps to give a fine powder, which can be used in various fields of application.

In subjecting the aqueous PTFE polymer dispersion to coagulation, the aqueous dispersion obtained by emulsion polymerization, for example a polymer latex, is generally diluted to a polymer concentration of 10 to 20% by mass using water and, after pH adjustment to a neutral or alkaline level under certain circumstances, stirred, in a vessel equipped with a stirrer, more vigorously than the stirring during reaction. The coagulation may also be carried out by stirring while adding, as a coagulating agent, a water-soluble organic compound such as methanol or acetone, an inorganic salt such as potassium nitrate or ammonium carbonate or an inorganic acid such as hydrochloric acid, sulfuric acid or nitric acid or the like. The coagulation may also be carried out continuously using an in-line mixer or the like.

When one or more of pigments for coloration and/or of various fillers for improvements in mechanical properties are added prior to coagulation or during coagulation, pigmented or filled PTFE polymer fine powder grades can be obtained with the pigment(s) and/or filler(s) uniformly dispersed therein.

The drying of the wet powder obtained by coagulation of the aqueous PTFE polymer-dispersion is generally effected using such means as vacuum, high-frequency or hot air while maintaining the wet powder in a condition such that it flows little, preferably it stands still. Friction among powder particles at elevated temperatures, in particular, generally exerts unfavorable influences on the PTFE polymer in fine powder form. This is because this kind of the particles comprising PTFE polymer have a property such that they readily fibrillate upon exposure to even a weak shearing force and lose their original stable particle structure.

The above drying is carried out at a drying temperature of 10 to 250° C., preferably 100 to 200° C. The PTFE polymer fine powder thus obtained is preferably used for molding and, as proper uses thereof, there may be mentioned, among others, tubes for use in hydraulic or fuel systems in airplanes or automobiles, and, further, flexible hoses for transporting liquid chemicals, steam or the like, and electric wire coatings or coverings.

The aqueous PTFE polymer dispersion obtained by the above-mentioned polymerization, when supplemented with a nonionic surfactant, is stabilized and, after further concentration, is preferably used in various fields of application in the form of a composition supplemented with an organic or inorganic filler(s) according to the intended purpose. The above composition, when applied to metal or ceramic substrates, can give coated surfaces having nonstickiness and a low coefficient of friction and excellent in gloss, wear resistance, weather resistance and heat resistance. Thus, it is suited for use in coating rolls and cooking utensils and impregnating processing of glass cloths.

(II) Melt-Processible Resins (1) In the production method of the invention, the polymerization for producing FEP is preferably carried out generally at a polymerization temperature of 60 to 100° C. and a polymerization pressure of 0.7 to 4.5 MPa.

The monomer composition (on the % by mass basis) of the FEPs is preferably TFE:HFP=(60 to 95):(5 to 40), more preferably (85 to 90):(10 to 15). The FEPs may be ones modified with a perfluoro(alkyl vinyl ether) as a third component used in a proportion within the range of 0.5 to 2% by mass relative to the sum of the monomers.

In the polymerization of the FEPs, the fluoroalkylcarboxylic acid derivatives mentioned above can be used within the usage range for the production method of the invention. Generally, they are used at an addition level of 0.0001 to 5% by mass relative to the aqueous medium.

In the polymerization of the FEPs, use is preferably made, as a chain transfer agent, of cyclohexane, methanol, ethanol, carbon tetrachloride, chloroform, methylene chloride or methyl chloride, for instance, and, as a pH buffering agent, of ammonium carbonate, disodium hydrogen phosphate or the like.

(2) In the production method of the invention, the polymerization for producing TFE/perfluoro(alkyl vinyl ether) copolymers, such as PFA and MFA copolymers, is preferably carried out generally at a polymerization temperature of 60 to 100° C. and a polymerization pressure of 0.7 to 2.5 MPaG.

Preferred as the monomer composition (in mole percent) for the TFE/perfluoro(alkyl vinyl ether) copolymers is TFE:(perfluoro alkyl vinyl ether)=(95 to 99.7):(0.3 to 5), more preferably (98 to 99.5):(0.5 to 2). Preferably used as the perfluoro(alkyl vinyl ether) are those represented by the formula: $CF_2=CFORf$ (in which Rf is a perfluoroalkyl group containing 1 to 6 carbon atoms).

In the polymerization of the TFE/perfluoro(alkyl vinyl ether) derivatives, the fluoroalkylcarboxylic acid derivatives mentioned above can be used within the usage range for the production method of the invention. Generally, however, they are used at an addition level of 0.0001 to 2% by mass relative to the aqueous medium.

In the polymerization of the TFE/perfluoro(alkyl vinyl ether) copolymers, use is preferably made, as a chain transfer agent, of cyclohexane, methanol, ethanol, carbon tetrachloride, chloroform, methylene chloride, methyl chloride, methane or ethane, for instance, and, as a pH buffering agent, of ammonium carbonate, disodium hydrogen phosphate or the like.

(3) In the production method of the invention, the polymerization for producing the ETFE copolymers is preferably carried out generally at a polymerization temperature of 20 to 100° C. and a polymerization pressure of 0.5 to 0.8 MPaG.

Preferred as the monomer composition (in mole percent) of the ETFEs is TFE:ethylene=(50 to 99):(50 to 1). The ETFEs may be those modified with a third monomer in a proportion within the range of 0 to 20% by mass relative to the sum of the monomers. The ratio is preferably TFE:ethylene:third monomer=(70 to 98):(30 to 2):(4 to 10). Preferred as the third monomer are 2,3,3,4,4,5,5-heptafluoro-2-pentene ($CH_2=CFCF_2CF_2CF_2H$) and 2-trifluoromethyl-3,3,3-trifluoropropene (($CF_3)_2C=CH_2$).

In the polymerization of the ETFEs, the fluoroalkylcarboxylic acid derivatives mentioned above can be used within the usage range for the production method of the invention. Generally, they are used at an addition level of 0.0001 to 2% by mass relative to the aqueous medium.

In the polymerization of the ETFEs, use is preferably made, as a chain transfer agent, of cyclohexane, methanol, ethanol, carbon tetrachloride, chloroform, methylene chloride, methyl chloride or the like.

(III) Elastomeric Polymers

In carrying out the polymerization for producing elastomeric polymers according to the method of the invention, a pressure-resistant reaction vessel equipped with a stirrer is charged with pure water and the fluoroalkylcarboxylic acid derivative of the invention and, after deoxygenation, further charged with the monomers, the temperature is raised to a predetermined level, and a polymerization initiator is added to initiate the reaction. Since otherwise the pressure lowers with the progress of the reaction, additional quantities of the monomers are fed to the reaction vessel continuously or intermittently so as to maintain the initial pressure. After completion of feeding of predetermined amounts of the monomers, the feeding is stopped, the monomers remaining in the reaction vessel are purged away, and the temperature is returned to room temperature. The reaction is thus finished. In the case of emulsion polymerization, the polymer latex formed is preferably taken out of the reaction vessel continuously.

In particular when thermoplastic elastomers are to be produced, it is also possible to employ the method of accelerating the eventual rate of polymerization as compared with the conventional polymerizations by synthesizing fine polymer particles once at a high surfactant concentration and, after dilution, further carrying out the polymerization, as disclosed in International Publication WO 00/01741.

In producing the elastomeric polymers, the reaction conditions are to be properly selected from the viewpoint of the desired physical properties of the polymer and of the polymerization rate control. Generally, the polymerization is carried out at a polymerization temperature of −20 to 200° C., preferably 5 to 150° C., and a polymerization pressure of 0.5 to 10 MPaG, preferably 1 to 7 MPaG. Preferably, the pH of the polymerization medium is maintained generally at 2.5 to 9 with a pH adjusting agent, which is to be described later herein, in the conventional manner, for instance.

As the monomers to be used in producing the elastomeric polymers, there may be mentioned vinylidene fluoride as well as fluorine-containing, ethylenically unsaturated monomers containing at least the same number of fluorine atoms as the number of carbon atoms and capable of copolymerizing with vinylidene fluoride.

As the fluorine-containing ethylenically unsaturated monomers, there may be mentioned, among others, trifluoropropene, pentafluoropropene, hexafluorobutene and octafluorobutene. Among them, hexafluoropropene is particularly suited for use in view of the characteristics of the elastomers obtainable when it blocks the polymer crystal growth. As the fluorine-containing, ethylenically unsaturated monomers, there may further be mentioned trifluoroethylene, TFE, CTFE, etc., and fluorine-containing monomers having one or more chlorine and/or bromine substituents may also be used. Perfluoro(alkyl vinyl ether) species, for example perfluoro(methyl vinyl ether), can also be used. TFE and HFP are preferred for the production of the elastomeric polymers.

Preferred as the monomer composition (in % by mass) of the elastomeric polymers is vinylidene fluoride:HFP:TFE= (20 to 70):(20 to 60):(0 to 40). Elastomeric polymers having this composition show good elastomer characteristics, chemical resistance and heat stability.

In the polymerization of the elastomeric polymers, the fluoroalkylcarboxylic acid derivatives mentioned above can be used within the usage range for the production method of the invention. Generally, they are used at an addition level of 0.0001 to 5% by mass relative to the aqueous medium.

In the polymerization of the elastomeric polymers, any of the inorganic radical polymerization initiators known in the art can be used as the polymerization initiator. Those water-soluble inorganic peroxides known in the art, for example sodium, potassium and ammonium persulfate, perphosphate, perborate, percarbonate and permanganate, are particularly useful as the inorganic radical polymerization initiator. The radical polymerization initiator can be further activated by a reducing agent such as sodium, potassium or ammonium sulfite, bisulfite, metabisulfite, hyposulfite, thiosulfate, phosphite or hypophosphite, or by a readily oxidizable metal compound such as a ferrous salt, cuprous salt or silver salt. Ammonium persulfate is a suitable inorganic radical polymerization initiator, and the combined use of ammonium persulfate and sodium bisulfite in a redox system is more preferred.

The level of addition of the polymerization initiator is properly selected within the range of 0.0001 to 10% by mass, preferably 0.01 to 5% by mass, relative to the sum of the monomers, depending on the desired molecular weight of the polymer and the polymerization reaction rate.

In the polymerization of the above elastomeric polymers, any of the chain transfer agents known in the art can be used. In the case of PVDF polymerization, hydrocarbons, esters, ethers, alcohols, ketones, chlorine compounds and carbonates can be used and, in the case of the thermoplastic elastomers, hydrocarbons, esters, ethers, alcohols, chlorine compounds and iodine compounds can be used. Among them, acetone and isopropyl alcohol are preferred in the case of PVDF polymerization and, in the case of thermoplastic elastomer polymerization, isopentane, diethyl malonate and ethyl acetate are preferred from the viewpoint that the rate of reaction is hardly lowered thereby, and $I(CF_2)_4I$, $I(CF_2)_6I$, $ICH_2I$ and like diiodide compounds are preferred from the viewpoint that the polymer termini can be iodinated and the polymer can be used as a reactive one.

The usage of the chain transfer agent is generally $0.5 \times 10^{-3}$ to $5 \times 10^{-3}$ mole percent, preferably $1.0 \times 10^{-3}$ to $3.5 \times 10^{-3}$ mole percent, relative to the total amount of the monomers fed.

In the polymerization of the elastomeric polymers, the polymerization of PVDF can be preferably carried out using a paraffin wax or the like as an emulsion stabilizer, and the polymerization of the thermoplastic elastomers can be preferably carried out using a phosphate salt, sodium hydroxide, potassium hydroxide or the like as a pH adjusting agent.

At the time of completion of the polymerization, the elastomeric polymers produced in accordance with the invention have a solid matter concentration of 10 to 40% by mass, an average primary particle diameter of 0.03 to 1 μm, preferably 0.05 to 0.5 μm, and a number average molecular weight of 1,000 to 2,000,000.

The average primary elastomeric polymer particle diameter can be determined, for example, by using a dynamic light scattering measuring device equipped with a He—Ne, Ar or like laser light source.

The elastomeric polymers obtained by the invention can be converted, according to need, to dispersions suited for rubber molding processing by adding a dispersion stabilizer such as a hydrocarbon-derived surfactant, and concentrating, for instance. The dispersions are treated by pH adjustment, coagulation, heating, etc. The respective treatments are carried out in the following manner.

The pH adjustment consisting in adjusting the pH to 2 or below by adding a mineral acid such as nitric acid, sulfuric acid, hydrochloric acid or phosphoric acid and/or a carboxylic acid containing not more than 5 carbon atoms and having a pK=4.2 or below, for instance.

The coagulation is carried out by adding an alkaline earth metal salt. As the alkaline earth metal salt, there may be mentioned calcium or magnesium nitrate, chlorate and acetate.

Either of the pH adjustment and the coagulation may be carried out first. Preferably, however, the pH adjustment is carried out first.

After both procedures, the elastomers are washed with an equal volume of water to remove the buffer solution, salt and other impurities occurring in slight amounts within the elastomers, followed by drying. The drying is generally carried out in a drying oven at elevated temperatures of about 70 to 200° C. under circulating hot air.

The method of producing a fluoropolymer according to the invention generally gives the fluoropolymer at a concentration of 5 to 70% by mass based on the aqueous dispersion obtained by the above polymerization reaction.

A preferred lower limit to the fluoropolymer concentration in the aqueous dispersion is 10% by mass, a more preferred lower limit is 15%, a preferred upper limit is 40% by mass, a more preferred upper limit is 35% by mass, and a still more preferred upper limit is 30% by mass.

The aqueous dispersions just after polymerization as obtained by the above polymerization reaction may be concentrated or subjected to dispersion stabilization treatment to give dispersions, or subjected to coagulation or flocculation, followed by recovery and drying to give powders, aggregates or other solid forms. The method of producing fluoropolymers according to the invention is to produce fluoropolymers, and the fluoropolymers produced may be the fluoropolymers dispersed in the respective aqueous dispersions just after polymerization, or the fluoropolymers dispersed in the dispersions mentioned above, or the fluoropolymers in the form of the above-mentioned powders, aggregates or other solids.

The term "aqueous dispersion just after polymerization" means one not yet subjected to any procedure for substantially changing the fluoropolymer concentration after completion of the polymerization reaction. Such procedure includes, among other, concentration, coagulation, flocculation, etc., and these procedures give rise to the formation of particles (secondary particles) increased in diameter as a result of aggregation of fluoropolymer particles (primary particles) in the aqueous dispersions just after polymerization.

The fluoropolymer aqueous dispersion of the invention is the dispersion wherein a particle comprising a fluoropolymer is dispersed in an aqueous medium in the presence of the above-mentioned fluoroalkylcarboxylic acid derivative or the surfactant of the invention.

The fluoropolymer aqueous dispersion of the invention may be the aqueous dispersion just after polymerization, or the dispersion obtained by subjecting the aqueous dispersion just after polymerization to such procedures as the above-mentioned concentration, dispersion stabilization treatment and so forth, or the dispersion resulting from dispersing the powder of fluoropolymer in an aqueous medium in the presence of the above-mentioned fluoroalkylcarboxylic acid derivative or the surfactant of the invention.

In the fluoropolymer aqueous dispersion of the invention, the "aqueous medium" is a dispersion medium, namely a water-containing liquid. The aqueous dispersion medium is not particularly restricted provided that it contains water and, thus, for example, any of the aqueous media usable in the production method of the invention can be used. The aqueous medium may be the aqueous medium itself used in the polymerization.

In the fluoropolymer aqueous dispersion of the invention, the above-mentioned fluoroalkylcarboxylic acid derivative of the invention may be in a state of ionic dissociation of the —COOM moiety in the general formula (i) in the aqueous medium.

The fluoropolymer aqueous dispersion of the invention in which the fluoroalkylcarboxylic acid derivative of the invention has a good balance between the affinity for the fluoropolymer and the affinity for the aqueous medium can exhibit an excellent dispersing force just as in the case of the use thereof as a surfactant in the production method mentioned above.

The fluoropolymer aqueous dispersion of the invention, when it is an aqueous dispersion just after polymerization, preferably has a number average primary particle diameter of about 0.03 to 1 μm. The fluoropolymer aqueous dispersion of the invention, even when it has a number average primary particle diameter within the above range, is excellent in dispersion stability and mechanical stability and, for example, can be prevented from adhering to the polymerization vessel inside wall or stirrer blade in the step of polymerization. A more preferred lower limit is 0.05 μm, and a more preferred upper limit is 0.5 μm.

The primary particle concentration is preferably about 5 to 70% by mass. A more preferred lower limit to that concentration is 10% by mass, a still more preferred lower limit is 15% by mass, and a preferred upper limit is 60% by mass.

On the other hand, the above fluoropolymer aqueous dispersion, when it is a dispersion obtained by concentration and dispersion stabilization treatment, among others, contains secondary particles of the fluoropolymer preferably at a concentration of 30 to 70% by mass.

In the fluoropolymer aqueous dispersion of the invention, the concentration of the fluoroalkylcarboxylic acid derivative is preferably 0.0001 to 20% by mass. At levels lower than 0.0001% by mass, the dispersion stability may be poor and, at levels exceeding 20% by mass, the dispersing effect is no more proportional to the abundance thereof and this is of no practical use. A more preferred lower limit to the above content is 0.001% by mass, a more preferred upper limit to the above content is a concentration of 10% by mass and a more preferred upper limit is 2% by mass.

The fluoropolymer aqueous dispersion of the invention may be one prepared as a dispersion by subjecting the aqueous dispersion just after polymerization to such procedures as concentration and dispersion stabilization treatment.

The concentration can be carried out by any of those methods known in the art, and the dispersion can be concentrated to a fluoropolymer concentration of 40 to 70% by mass according to the intended use of the dispersion. The concentration procedure may impair the dispersion stability in certain instances. In such cases, a dispersion stabilizer may further be added.

As the dispersion stabilizer, any of the above-mentioned fluoroalkylcarboxylic acid derivatives or other various surfactants may be added. The various dispersion stabilizers include, but are not limited to, nonionic surfactants such as polyoxyalkylene alkyl ethers, in particular polyoxyethylene ethers such as polyoxyethylene alkylphenyl ethers (e.g. Triton X-100 (™) of Rohm and Haas), polyoxyethylene isotridecyl ether (Dispanol TOC (™) of NOF (Nippon Oil and Fat) Corp.) and polyoxyethylenepropyl tridecyl ether.

The total content of the dispersion stabilizers is preferably 0.5 to 20% by mass relative to the solid matter in the dispersion. At levels lower than 0.5% by mass, the dispersion stability may be poor and, at levels exceeding 20% by mass, the dispersing effect is no more proportional to the abundance thereof and this is of no practical use. A more preferred lower limit to the above total content is 2% by mass and a more preferred upper limit is 12% by mass.

In some fields of application, the aqueous dispersion obtained by carrying out the polymerization can also be subjected to dispersion stabilization treatment without concentration to give a fluoropolymer aqueous dispersion having a long pot life. As the dispersion stabilizer to be used, there may be mentioned the same ones as described above.

The uses of the fluoropolymer aqueous dispersion are not particularly restricted but, when it is applied as the aqueous dispersion as it is, the following uses may be mentioned among others: coating of substrates which comprises applying it to the substrates and drying the coatings, if necessary followed by baking; impregnation of nonwoven fabrics, resin moldings and other porous supports which comprises impregnating the supports with the dispersion, followed by drying, if necessary further followed by baking; and cast film formation which comprises applying the dispersion onto substrates such as glass substrates, drying the coated substrates and, if necessary after immersion in water, peeling off the coatings from the substrates to give thin films or membranes. In these applications, the dispersion is used as an aqueous dispersion type coating composition, an electrode binder, or a water repellent composition for electrodes, for instance.

The fluoropolymer aqueous dispersion of the invention can be used as an aqueous coating composition after incorporation of one or more known formulating ingredients selected from among pigments, thickening agents, dispersing agents, antifoaming agents, antifreezing agents, film-forming auxiliaries and the like and/or further compounding of another polymeric compound.

The fluoropolymer film/membrane obtained by coating, impregnation or cast film formation using the above-mentioned fluoropolymer aqueous dispersion also constitutes an aspect of the present invention.

As other uses of the fluoropolymer aqueous dispersion of the invention, there may be mentioned those uses in which a powder obtained by subjecting the fluoropolymer aqueous dispersion to coagulation or flocculation to recover the polymer and drying the same, if desired followed by granulation is utilized.

The coagulation or flocculation can be carried out employing any of the methods known in the art. For example, the method comprising adding a coagulant (or flocculant) to the aqueous dispersion with stirring to cause coagulation (or flocculation), the method comprising freezing and thawing the aqueous dispersion to cause coagulation (freeze coagulation method), the method comprising only mechanically stirring the aqueous dispersion at a high speed to cause coagulation (mechanical coagulation method), or the method comprising spouting the aqueous dispersion from a narrow nozzle and simultaneously causing water to evaporate (spray coagulation method) is preferably employed. If necessary, a flocculation auxiliary may be added. The drying may be carried out by allowing the polymer to stand at room temperature or may be carried out with heating up to 250° C.

The fluoropolymer powder obtained by coagulating the above fluoropolymer aqueous dispersion also constitutes a further aspect of the invention.

The fluoropolymer aggregate obtained by coagulating the above fluoropolymer aqueous dispersion, which is a fine powder comprising a polytetrafluoroethylene polymer powder, a powder or a pellet each comprising a melt-processable resin or a coagulation comprising an elastomeric polymer, also constitutes a further aspect of the present invention.

The powder obtained can be used, for example, as a molding material suited for paste extrusion molding, for instance, after incorporation of a lubrication auxiliary, or as a powder coating composition, if desired after incorporation of a pigment or pigments.

The fluoropolymer molded article obtained by molding using the above fluoropolymer powder or fluoropolymer aggregate also constitutes a further aspect of the present invention.

EFFECTS OF THE INVENTION

The fluoroalkylcarboxylic acid derivative of the invention, which has the constitution described hereinabove, can be properly used as a surfactant in the production of fluoropolymers, as a dispersant for fluoropolymer aqueous dispersions and, further, in various other fields of application. The method of producing fluoropolymers according to the invention, which uses the above-mentioned fluoroalkylcarboxylic acid derivative as a surfactant, can produce the fluoropolymers with great efficiency.

Further, the fluoropolymer aqueous dispersion of the invention, in which a particle comprising a fluoropolymer is dispersed in an aqueous medium in the presence of the fluoroalkylcarboxylic acid derivative of the invention or the surfactant of the invention, is excellent in stability and workability, among others.

BEST MODES FOR CARRYING OUT THE INVENTION

The following synthesis examples, working examples and comparative examples will illustrate the present invention. These synthesis examples and working examples are, however, by no means limitative of the scope of the invention.

The methods used for the measurements in the respective examples are shown below.

Solid matter concentration: Determined based on the weight loss after 1 hour of drying of each aqueous dispersion at 150° C.

Surface tension: Measured at 25° C. by the Wilhelmy method.

Standard specific gravity (SSG): Measured according to ASTM D 1457-69.

Average primary particle diameter (PTFE): Determined indirectly from the transmittance of the incident light of 550 nm per unit length as transmitted by each dispersion diluted to a solid matter concentration of about 0.02% by mass based on a working curve constructed by plotting such transmittance data against the average particle diameter data obtained from electron photomicrographs.

The transmittance measurements were carried out using a Microtrac 9340 UPA dynamic light scattering measuring apparatus (product of Honeywell).

Average primary particle diameter (elastomeric polymer): Determined using a dynamic light scattering measuring apparatus equipped with a He—Ne or Ar laser light source.

Solid matter content (P.C.): Determined from the weight loss after 1 hour of heating of 1 g of each aqueous dispersion in a hot air oven at 150° C.

Number average molecular weight: Measured by gel permeation chromatography [G.P.C.] using tetrahydrofuran [THF] as the eluent.

Mooney viscosity: Measured using an Alpha Mooney MV2000E viscometer (Product of Alpha Technologies).

Tensile testing: Carried out according to JIS K 6251 using an Orientec Tensilon RTA-1T testing machine (product of Orientec Co.).

Permanent compressive strain (Cs): Measured according to JIS K 6262.

Hardness (Shore A peak value): Measured according to ASTM D 1415.

SYNTHESIS EXAMPLE 1

A 10-L stainless steel pressure vessel was charged with 2000 g of tetraglyme dehydrated in advance with molecular sieves and 100 g of CsF dried in advance over $P_2O_5$ and, after nitrogen substitution and evacuation, further charged with 200 g of $CF_3CF_2COF$ under pressure, and maintained at 30° C. Thereto was fed 2,2,3,3-tetrafluorooxetane under pressure in about 70-g portions at intervals of about 1 hour and the reaction was allowed to proceed. After arrival of the total charge of 2,2,3,3-tetrafluorooxetane at 1750 g, the additional charging was stopped, and the reaction was further allowed to proceed for at least 10 hours. At the time when no more pressure change was observed and almost no 2,2,3,3-tetrafluorooxetane was detected in the liquid layer by gas chromatography, the residual gas was released and, after nitrogen substitution, the autoclave was warmed to 50° C., the pressure was reduced to about $4.0\times10^3$ Pa to give 2470 g of $CF_3CF_2CF_2OCH_2CF_2COF$ as a crude product.

The crude product $CF_3CF_2CF_2OCH_2CF_2COF$ was rectified under nitrogen at ordinary pressure using a 10-stage Oldershaw rectification column to give 2020 g of $CF_3CF_2CF_2OCH_2CF_2COF$. Its boiling point was 78° C. A 30-g portion of the $CF_3CF_2CF_2OCH_2CF_2COF$ obtained was hydrolyzed by gradually pouring the same into 30 g of dilute sulfuric acid with stirring. The product was washed several times with dilute sulfuric acid and then distilled under reduced pressure to give 20.5 g of pure $CF_3CF_2CF_2OCH_2CF_2COOH$. The thus-obtained $CF_3CF_2CF_2OCH_2CF_2COOH$ had a boiling point of 84° C. at a pressure of about $2.7\times10^3$ Pa. A 5.9-g portion of the $CF_3CF_2CF_2OCH_2CF_2COOH$ obtained was dissolved completely in 29.8 g of pure water. The pH of the solution was 1.28. The pH was adjusted to 7 by adding an aqueous solution of sodium hydroxide dropwise. The resulting aqueous solution contained 19.8% by mass of $CF_3CF_2CF_2OCH_2CF_2COONa$. The aqueous solution was dried under vacuum at 80° C., and the melting point of the $CF_3CF_2CF_2OCH_2CF_2COONa$ obtained (solid salt) was measured by DSC and found to be 191.8° C. A 0.2% (by mass) aqueous solution of this $CF_3CF_2CF_2OCH_2CF_2COONa$ had a surface tension of 68.5 mN/m. The surface tension of a 2.0% (by mass) aqueous solution thereof was 48.0 mN/m.

SYNTHESIS EXAMPLE 2

An aqueous solution of $CF_3CF_2CF_2OCH_2CF_2COONH_4$ (20.2% by mass) was prepared in the same manner as in Synthesis Example 1 except that the $CF_3CF_2CF_2OCH_2CF_2COOH$ prepared in Synthesis Example 1 was neutralized to pH 7 using aqueous ammonia in lieu of the aqueous solution of sodium hydroxide.

A 0.2% (by mass) aqueous solution of the $CF_3CF_2CF_2OCH_2CF_2COONH_4$ obtained had a surface tension of 68.4 mN/m.

SYNTHESIS EXAMPLE 3

A 300-ml stainless steel pressure vessel was charged with 70 ml of tetraglyme dehydrated in advance with molecular sieves and 1.25 g of cesium fluoride dried in advance over $P_2O_5$ and, after nitrogen substitution and evacuation, further charged with 52.4 g of $CF_3CF_2COF$ under pressure, and maintained at 20° C. Thereto was fed about 33.2 g of 2,2,3,3-tetrafluorooxetane under pressure in about six divided portions and the reaction was allowed to proceed. The reaction was further allowed to proceed for at least 2 hours. At the time when no more pressure change was observed and almost no 2,2,3,3-tetrafluorooxetane was detected in the liquid layer by gas chromatography, the residual gas was released, and the contents were taken out and rectified to give 32.3 g of pure $CF_3CF_2CF_2CF_2OCH_2CF_2COF$. Its boiling point was 65.0° C. at a pressure of $2.5\times10^4$ Pa.

A 28-g portion of the $CF_3CF_2CF_2CF_2OCH_2CF_2COF$ obtained was hydrolyzed by gradually pouring the same into dilute sulfuric acid with stirring. The product was washed several times with dilute sulfuric acid and distilled under reduced pressure to give 25.7 g of pure $CF_3CF_2CF_2CF_2OCH_2CF_2COOH$. The $CF_3CF_2CF_2CF_2OCH_2CF_2COOH$ obtained had a boiling point of 75.5° C. at a pressure of $1.3\times10^3$ Pa. A 3.0-g portion of the $CF_3CF_2CF_2CF_2OCH_2CF_2COOH$ obtained was neutralized with an aqueous solution of sodium hydroxide, and the product was dried to give the desired compound. A 0.2% (by mass) aqueous solution of this $CF_3CF_2CF_2CF_2OCH_2CF_2COONa$ had a surface tension of 63.4 mN/m. A 2.0% (by mass) aqueous solution thereof had a surface tension of 37.5 mN/m.

SYNTHESIS EXAMPLE 4

An aqueous solution of $CF_3CF_2CF_2CF_2OCH_2CF_2COONH_4$ was prepared in the same manner as in Synthesis Example 1 except that the $CF_3CF_2CF_2CF_2OCH_2CF_2COOH$ prepared in Synthesis Example 3 was neutralized to pH 7 using aqueous ammonia in lieu of the aqueous solution of sodium hydroxide.

SYNTHESIS EXAMPLE 5

A 100-ml PFA-made vessel equipped with a gas inlet pipe was charged with 39.6 g of the $CF_3CF_2CF_2OCH_2CF_2COOH$ prepared in Synthesis Example 1, and nitrogen was passed through the vessel at a flow rate of 20 ml/minute for 10 minutes to deprive the system of oxygen and moisture. Fluorine gas diluted to 24% with nitrogen was passed through the vessel warmed on a water bath at 60° C. at a flow rate of 40 ml/minute for 15.3 hours. After substitution of the vessel inside atmosphere with nitrogen, 37.5 g of the reaction product was recovered. This reaction product was rectified at ordinary pressure to give 25.1 g of fraction 1 (boiling point 58° C.) and 11.9 g of fraction 2 (boiling point 80.5° C.). Gas chromatography revealed that the fraction 1 had a purity of 95% and the fraction 2 had a purity of 99.5%. Based on the results of F-NMR, the fraction 1 was identified as $CF_3CF_2CF_2OCF_2CF_2COOH$ in view of the appearance of a spectral peak at −123.3 ppm and the fraction 2 as $CF_3CF_2CF_2OCHFCF_2COOH$ in view of the appearance of a spectral peak at −148.4 ppm. A 1-g portion of each fraction was dissolved in 10 g of water, the solution was adjusted to pH 8 by addition of aqueous ammonia, followed by drying at 80° C. under vacuum. Thus were obtained $CF_3CF_2CF_2OCF_2CF_2COONH_4$ and $CF_3CF_2CF_2OCHFCF_2COONH_4$, respectively.

Preparation of VDF/HFP Polymer Latexes

EXAMPLE 1

$CF_3CF_2CF_2OCH_2CF_2COONa$ (0.4 g) was dissolved in 200 mL of pure water, the solution was placed in a 500-mL autoclave and, after nitrogen substitution, the autoclave was charged with VDF and HFP (mole ratio: VDF:HFP=65:35) as monomers, and the monomers (mole ratio: VDF:HFP=65:35) were further fed, under pressure (0.85 MPa), to the autoclave at 80° C. An aqueous APS solution composed of 0.04 g of ammonium persulfate (APS) and 2.00 g of pure water was added to start the polymerization. After pressure reduction to a predetermined level of 0.75 MPa, the above gaseous monomers (mole ratio: VDF:HFP=78:22) were fed to restore the pressure of 0.85 MPa. The procedure for feeding the above VDF and HFP was carried out for 3 hours, the residual monomers were then removed, the autoclave was cooled, and the contents were taken out. The aqueous dispersion taken out had a solid matter content (P.C.) of 5.9% by mass and the fluoropolymer had an average primary particle diameter of 102.8 nm. The composition of the fluoropolymer produced was determined by F-NMR; the monomer mole ratio was VDF:HFP=78:22.

EXAMPLE 2

The polymerization of Example 1 was conducted in the same manner for 6 hours except that the amount of $CF_3CF_2CF_2OCH_2CF_2COONa$ was changed to 4 g. The aqueous dispersion obtained had a solid matter content of 5.0% by mass and the fluoropolymer had an average primary particle diameter of 50.7 nm. The composition of the fluoropolymer produced was determined by F-NMR; the monomer mole ratio was VDF:HFP=79:21.

EXAMPLE 3

The polymerization of Example 1 was conducted in the same manner for 3 hours except that $CF_3CF_2CF_2OCH_2CF_2COONH_4$ was used in lieu of $CF_3CF_2CF_2OCH_2CF_2COONa$. The aqueous dispersion obtained had a solid matter content of 5.4% by mass and the fluoropolymer had an average primary particle diameter of 217.3 nm. The composition of the fluoropolymer produced was determined by F-NMR; the monomer mole ratio was VDF:HFP=79:21.

EXAMPLE 4

A 3-L autoclave was used. This was charged with 1366 mL of pure water and 2.74 g of $CF_3CF_2CF_2OCH_2CF_2COONa$, and the polymerization of VDF and HFP was started at a polymerization pressure of 1.55 MPa in the same manner as in Example 1 for 18.8 hours except that, after pressure reduction to 1.45 MPa, VDF and HFP were additionally fed and, at the time of arrival of the amount of the additional monomers at 8 g, 2.94 g of $I(CF_2CF_2)_2I$ was fed and additional portions of ammonium persulfate were fed at 3-hour intervals. The aqueous dispersion obtained had a solid matter content of 28.2% by mass and the fluoropolymer had an average primary particle diameter of 266.6 nm. The composition of the fluoropolymer produced was determined by F-NMR; the monomer mole ratio was VDF:HFP=76:24.

Preparation of an Elastomer Comprising VDF/HFP Polymer

EXAMPLE 5

The aqueous dispersion obtained in Example 4 was coagulated using potassium ammonium sulfate(potassium alum), and the aggregate was washed with pure water and dried at 130° C. for 12 hours. An elastomeric VDF/HFP polymer was obtained which had a Mooney viscosity of $ML_{1+10}(100°$ C.)=28.6. The composition of the fluoropolymer produced was determined by F-NMR; the monomer mole ratio was VDF:HFP=76:24. A 0.1% (by mass) solution in THF was prepared from the elastomeric VDF/HFP polymer obtained and measured for number average molecular weight, weight average molecular weight and molecular weight distribution. No insoluble fraction was observed. Mn=62000, Mw=89000, Mw/Mn=1.4, and only a single peak was found.

A 100-part portion of the above solution of the VDF/HFP polymer in THF, 20 parts of MT carbon, 4 parts of triallyl isocyanurate [TAIC] and 1.5 parts of a dialkyl peroxide [crosslinking agent; trademark: Perhexa 25B (product of NOF Corp.)] were kneaded together on a 6-inch rubber roll. The composition obtained was subjected to cure degree testing at 160° C. using a JSR model II curastometer. The results are shown in Table 1.

TABLE 1

| | |
|---|---|
| ML (minimum cure degree) (kg · f) | 0.05 |
| MH (maximum cure degree) (kg · f) | 3.5 |
| T10 (Induction time) | 1.1 |
| T90 (Optimum cure time) | 3.3 |

(Note)

$$T10 = \frac{MH - ML}{10 + (\text{Time until arrival at ML (min.)})}$$

$$T90 = \frac{MH - ML}{90 + (\text{Time until arrival at ML (min.)})}$$

As shown in Table 1, the composition obtained was found to show good curing characteristics.

Using the above composition, 2-mm-thick sheets and P-24 O rings were molded by press curing (primary curing; 160° C.×10 minutes), followed by oven curing (secondary curing; 180° C.×4 hours).

No. 4 dumbbell test specimens were punched out from the 2-mm-thick sheets and subjected to tensile testing.

Further, the above P-24 O rings were subjected to 25% compression under the conditions of 200° C. for 72 hours, and the permanent compression strain (Cs) was measured.

Further, the hardness (Shore A peak value) was measured by the method described hereinabove.

The results are shown in Table 2.

TABLE 2

| Item (unit) | |
|---|---|
| 100% Modulus (MPa) | 2.03 |
| Breaking strength (MPa) | 21.2 |
| Elongation at break (%) | 440 |
| Hardness (Shore A peak value) | 65.8 |
| Permanent compression strain (%) | 25.85 |

As is shown in Table 2, the elastomeric composition obtained was found to be high in tensile strength and low in permanent compression strain.

COMPARATIVE EXAMPLE 1

The polymerization procedure of Example 4 was carried out in the same manner except that $CF_3CF_2CF_2OCH_2CF_2COONa$ was not used. At the final stage of polymerization, the rotation of the stirrer was out of order, and it became difficult to maintain the stirring during cooling after completion of the polymerization. About half of the polymer formed by polymerization was found abundantly sticking to the inside wall of the autoclave and to the stirrer shaft.

Preparation of PTFE Aqueous Dispersions

EXAMPLE 6

A 3-L stainless steel autoclave equipped with a stirring blade was charged with 1.5 L of deionized water, 60 g of paraffin wax (melting point 60° C.) and 86 mg of $CF_3CF_2CF_2OCH_2CF_2COONH_4$, and the system inside was substituted with TFE. The inside temperature was raised to 70° C., TFE was fed under pressure to an inside pressure of 0.78 MPa, and 5 g of a 0.6% (by mass) aqueous solution of ammonium persulfate [APS] was fed to initiate the reaction. To compensate the pressure reduction in the polymerization system with the progress of the polymerization, TFE was continuously fed to maintain the inside pressure at 0.78 MPa and, in this manner, the reaction was continued. At 1.4 hours after the start of polymerization, TFE was purged away to terminate the polymerization. The solid matter concentration of the aqueous dispersion obtained was 6.5% by mass, the standard specific gravity was 2.230, and the average primary particle diameter of the fluoropolymer was 340 nm.

EXAMPLE 7

The reaction of Example 6 was carried out in the same manner for 5.5 hours except that the amount of $CF_3CF_2CF_2OCH_2CF_2COONH_4$ was changed to 8600 mg. The solid matter concentration of the aqueous dispersion was 29.2% by mass, the standard specific gravity was 2.211, and the average primary particle diameter of the fluoropolymer was 365 nm.

EXAMPLE 8

The reaction of Example 6 was carried out in the same manner for 8.7 hours except that 1.81 g of $CF_3CF_2CF_2OCF_2CF_2COONH_4$ was used in lieu of $CF_3CF_2CF_2OCH_2CF_2COONH_4$. The solid matter concentration of the aqueous dispersion was 22.1% by mass, the standard specific gravity of the resin was 2.221, and the average primary particle diameter was 274 nm.

EXAMPLE 9

The reaction of Example 6 was carried out in the same manner for 2.7 hours except that 1.72 g of $CF_3CF_2CF_2OCHFCF_2COONH_4$ was used in lieu of $CF_3CF_2CF_2OCH_2CF_2COONH_4$. The solid matter concentration of the aqueous dispersion was 13.5% by mass, the standard specific gravity of the resin was 2.223, and the average primary particle diameter was 340 nm.

INDUSTRIAL APPLICABILITY

The fluoroalkylcarboxylic acid derivatives of the invention can be applied, for example, as surfactants in the production of fluoropolymers and as dispersants for fluoropolymer aqueous dispersion.

The invention claimed is:

1. A fluoroalkylcarboxylic acid derivative represented by the general formula (ii):

$$Rf^1OCHX^1CF_2COOM \qquad (ii)$$

wherein $Rf^1$ represents a straight or branched fluoroalkyl group containing 1 to 8 carbon atoms, said fluoroalkyl group may optionally contain 1 to 5 oxygen atoms in the principal chain thereof, $X^1$ represents hydrogen atom of fluorine atom, and M represents $NH_4$ or a monovalent metal element.

2. The fluoroalkylcarboxylic acid derivative according to claim 1, wherein $Rf^1$ is a straight or branched fluoroalkyl group containing 1 to 7 carbon atoms, said fluoroalkyl group may optionally contain 1 to 3 oxygen atoms in the principal chain thereof.

3. The fluoroalkylcarboxylic acid derivative according to claim 2, wherein $Rf^1$ is $CF_3$—, $CF_3CF_2$—, $CF_3CF_2CF_2$—, $(CF_3)2CF$—, $CF_3CF_2CF_2CF_2$—, $CF_3CF_2CF_2OCF(CF_3)CF_2$—, $HCF_2CF_2CF_2$— or $CF_3OCF(CF_3)CF_2$—.

4. A surfactant which comprises the fluoroalkylcarboxylic acid derivative according to claim 1.

5. A method of producing a fluoroalkylcarboxylic acid derivative, which comprises producing the fluoroalkylcarboxylic acid derivative according to claim 1 by converting a fluorocarboxylic acid fluoride represented by general formula (3):

$$Rf^1OCHX^1CF_2COF \qquad (3)$$

wherein $Rf^1$ and $X^1$ are as defined in claim 2, to a fluorocarboxylic acid salt.

6. The method of producing the fluoroalkylcarboxylic acid derivative according to claim 5, wherein the conversion of the fluorocarboxylic acid fluoride represented by the general formula (3) to the fluorocarboxylic acid salt is carried out by (A) a method comprising converting the terminal —COF group in said general formula (3) to —COOH by hydrolysis using an acid and converting the —COOH to —COOM by neutralization with an alkali, (B) a method comprising esterifying the terminal —COF group in said general formula (3) and, after separation of the ester, converting the ester moiety to —COOM by saponification, or (C) a method comprising esterifying the terminal —COF group in said general formula (3) and, after separation of the ester, converting the ester moiety to —COOM by saponification, then converting the latter to —COOH using an acid and then converting this to —COOM by neutralization with an alkali.

7. The method of producing the fluoroalkylcarboxylic acid derivative according to claim 5, wherein $Rf^1$ represents a straight or branched fluoroalkyl group containing 5 to 7 carbon atoms, said fluoroalkyl group may contain 1 to 5 oxygen atoms in the principal chain thereof.

* * * * *

UNITED STATES PATENT AND TRADEMARK OFFICE
CERTIFICATE OF CORRECTION

PATENT NO. : 7,589,234 B2  Page 1 of 1
APPLICATION NO. : 10/562730
DATED : September 15, 2009
INVENTOR(S) : Shigeru Morita et al.

It is certified that error appears in the above-identified patent and that said Letters Patent is hereby corrected as shown below:

Column 28, lines 10-12 delete "principal chain thereof, $X^1$ represents hydrogen atom of fluorine atom, and M represents $NH_4$ or a monovalent metal element." and insert -- principal chain thereof, $X^1$ represents hydrogen atom or fluorine atom, and M represents $NH_4$ or a monovalent metal element. --

Signed and Sealed this

Fifth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,589,234 B2 Page 1 of 1
APPLICATION NO. : 10/562730
DATED : September 15, 2009
INVENTOR(S) : Morita et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 190 days.

Signed and Sealed this

Twenty-first Day of September, 2010

David J. Kappos
*Director of the United States Patent and Trademark Office*